United States Patent [19]
Hinoshita et al.

[11] 3,775,688
[45] Nov. 27, 1973

[54] SYSTEM FOR TRANSMITTING, RECEIVING AND DECODING MULTILEVEL SIGNALS

[75] Inventors: Shigehiko Hinoshita, Yokohama; Shoji Hagiwara, Tokyo, both of Japan

[73] Assignee: Fujitsu, Limited, Kamikodanaka, Kawasaki, Japan

[22] Filed: Mar. 24, 1972

[21] Appl. No.: 237,638

[30] Foreign Application Priority Data
Mar. 25, 1971 Japan ................................ 46/17538

[52] U.S. Cl. .................... 325/42, 325/38 A, 325/65, 333/18
[51] Int. Cl. ........................... H04b 3/10, H04b 1/10
[58] Field of Search ............... 325/41, 42, 65, 38 A; 328/155, 162, 163; 333/18, 28; 235/181; 179/170.2

[56] References Cited

UNITED STATES PATENTS

| | | | |
|---|---|---|---|
| 3,305,798 | 2/1967 | Rappeport | 333/18 |
| 3,403,340 | 9/1968 | Becker et al. | 333/18 |
| 3,430,145 | 2/1969 | Lord | 325/42 |
| 3,445,771 | 5/1969 | Clapham et al. | 325/42 |
| 3,462,687 | 8/1969 | Becker et al. | 325/42 |
| 3,508,172 | 4/1970 | Kretzmer et al. | 333/18 |
| 3,573,624 | 4/1971 | Hartman et al. | 325/42 |
| 3,638,122 | 1/1972 | Gibson | 325/42 |
| 3,659,229 | 4/1972 | Milton | 325/42 |

*Primary Examiner*—Felix D. Gruber
*Attorney*—Harry John Staas et al.

[57] ABSTRACT

Apparatus for automatically equalizing a multilevel signal transmission system is disclosed for transmitting a signal in the form of a multilevel signal. In particular, an automatic equalization system is adapted to provide a reference level signal having fewer levels than the multilevel signal; predetermined level values are inserted in a train of multilevel signals at predetermined time intervals for the purpose of correct detection of the multilevel from the received signal waveform although intersymbol interference is introduced in a received multilevel signal owing to linear distortion of the transmission line such as amplitude distortion, phase distortion or the like. In the receiving side, the intersymbol interference with the reference level signal is detected and then an adjustment device of an automatic equalizer is controlled to correct intersymbol interference, with the result that the intersymbol interference in the multilevel signal to be transmitted is corrected.

18 Claims, 18 Drawing Figures

SYSTEM FOR TRANSMITTING, RECEIVING AND DECODING MULTILEVEL SIGNALS

BACKGROUND OF THE INVENTION

1. Field of the Invention

This invention relates to apparatus for transmitting signals over conventional, low bandwidth transmission lines, and in particular, to automatic equalization apparatus for substantially reducing interference imposed upon the transmitted signal by the transmission line.

2. Description of the Prior Art

In the case where a transmission line of relatively high transmission performance can be employed for efficient transmission of a digital signal, it is the practice in the art to transmit the signal in the form of a multilevel signal for the reduction of the bandwidth necessary for transmission. In the case of the multilevel signal transmission, a transmission pulse is permitted to have one of a plurality of predetermined $p$'s amplitude values and this implies that information of $\log_2 p$ bit can be transmitted with one pulse.

The multilevel signal transmission system necessitates correct transmission of the pulse amplitude at the expense of the reduction of the bandwidth necessary for the signal transmission, but an increase in the numper $p$ of the levels of the multilevel signal introduces many technical difficulties in the transmission of the amplitude levels without fail. Namely, the received waveform is greatly deformed by amplitude distortion, phase distortion or like linear distortion of the transmission line, and the "eye" pattern of the received waveform is remarkedly deteriorated, with the result that the error rate is also increased, as compared with a binary signal transmission. For the improvement of such distortion of the transmission line, a fixed equalizer is usually employed, but this equalizer is ineffective to changes in the transmission line distortion due to temperature change, secular variation, dispersion in lines, etc. Therefore, it is desired to provide an automatic equalizer which is capable of achieving a distortion correcting operation in response to such a change in distortion and such automatic equalizers have already been put in practical use in some technical fields.

Such automatic equalizers are divided into a preset type and an adaptive type. The preset equalizer is of the type that, after a test pattern transmitted from the transmitting side is received on the receiving side when a circuit is idle or changed over or when the error rate increases, the equalizer is adjusted to equalize the received test pattern waveform to ensure reception of a desired multilevel signal to be subsequently transmitted. With the automatic equalizer of this type, even if much distortion is present in the transmission line, it is possible to transmit a test signal waveform feasible for equalization on the receiving side, so that the equalization draw-in range can be enlarged. However, this automatic equalizer does not make any compensation for variations in the distortion of the transmission line in the absence of the test signal and requires an instruction from the receiving side for the transmission of the test signal waveform. Further, it is necessary to hold the equalization characteristic after completion of the equalization by presetting.

The adaptive equalizer is an automatic equalizer of such a type that distortion is always detected from a signal being transmitted and is equalized, based on the assumption that the level of the multilevel signal to be transmitted is random. Since the automatic equalizer of this type always detects and corrects the distortion of the transmission line, it is adaptable for changes in the distortion and neither requires an instruction from the receiving side nor necessitates holding of the characteristic for a long time after once equalized. However, the automatic adaptive equalizer does detect the distortion directly from the signal being transmitted, so that when the distortion is extremely great, the received signal is greatly distorted, making it difficult, if not impossible, to determine the level of the signal for equalization. Namely, the adaptive type automatic equalizer is narrow in the equalization draw-in range.

In the automatic equalization of the multilevel signal, it is necessary for equalization draw-in that the level of the received signal can be judged from its signal waveform on the receiving side. For example, in the case of the Zero-Forcing Algorithm, no trouble occurs in the reception of the multilevel signal as long as the "eye" of the "eye" pattern is open, but when the "eye" is closed, equalization draw-in is hardly achieved for too great distortion.

Accordingly, in the event that the signal electric power is limited, the "eye" opening of the received multilevel signal decreases with an increase in the number of levels of the multilevel signal, making equalization draw-in difficult. This implies that an increase in the number of levels of the multilevel signal necessitates the use of a transmission line which is almost distortionless. In the case of the preset type automatic equalizer, it is possible to use as a test pattern a signal having fewer levels than the multilevel signal to be actually transmitted, so that even if no "eye" opening exists for the multilevel signal to be transmitted, equalization draw-in is possible so long as the "eye" for the test pattern remains open.

SUMMARY OF THE INVENTION

It is therefore an object of this invention to provide an automatic equalization system which combines the features of the aforementioned preset and adaptive type equalizers and in which a reference level signal of a predetermined level is inserted in a multilevel signal train at predetermined time intervals to provide for enlarged equalization draw-in range.

It is a further object of this invention to provide an automatic equalization system in which intersymbol interference with a reference level signal of predetermined levels based on distortion of the transmission line is detected and an adjustment device of an automatic equalizer is adjusted in a direction to eliminate the detected intersymbol interference, thereby removing the intersymbol interference from a multilevel signal to be transmitted.

A still further object of this invention is to provide an automatic equalization system which employs new means for inserting, at predetermined time intervals, a reference level signal in a multilevel signal to be transmitted.

It is another object of this invention to provide an automatic equalization system which is adapted such that a predetermined level of a reference level signal is selected at a transition point of binary digit of a specified position represented in a binary number and the polarity of an error in the received reference level signal is detected with the binary digit of the specified position.

In accordance with these and other objects of the invention, the teachings of this invention are accomplished by providing a reference level signal having a fewer number of levels than the number of levels of the signals to be transmitted. Further, a predetermined level value is inserted in a train of the multilevel signals on the transmitting side at predetermined time intervals, and level change based on intersymbol interference is detected with the reference level signal being used as the reference on the receiving side, even in the absence of the "eye" opening for the multilevel signals to be transmitted. To perform this operation, the received reference level signal and a required number of received multilevel signals before and after the reference level signal are extracted, and the exclusive "OR" of an error in the received reference level signal and each extracted signal is calculated to detect intersymbol interference in the reference level signal. Further, for easy detection of the error in the received reference level signal, it is preferred to use the binary digit of a specified position represented in the form of a binary number.

BRIEF DESCRIPTION OF THE DRAWINGS

This invention will be more fully described in conjunction with the drawings, which include.

DESCRIPTION OF THE PREFERRED EMBODIMENTS

Figure 1A:
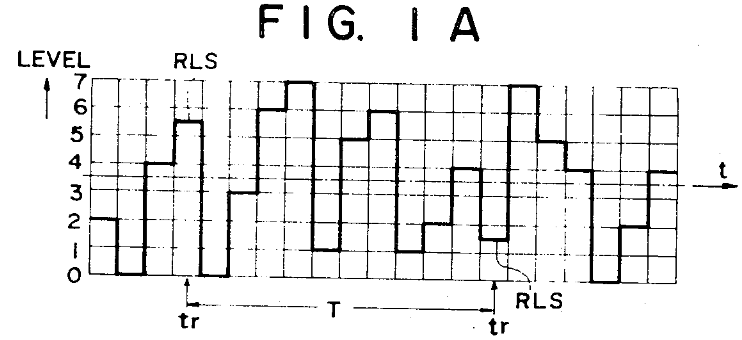
FIGS. 1A and 1B show a multilevel signal to be transmitted in accordance with the present invention, with FIG. 1A illustrating, for example, an octal signal and FIG. 1B illustrating a received multilevel signal smoothed by a transmission line owing to bandwidth restriction.
Figure 1B:
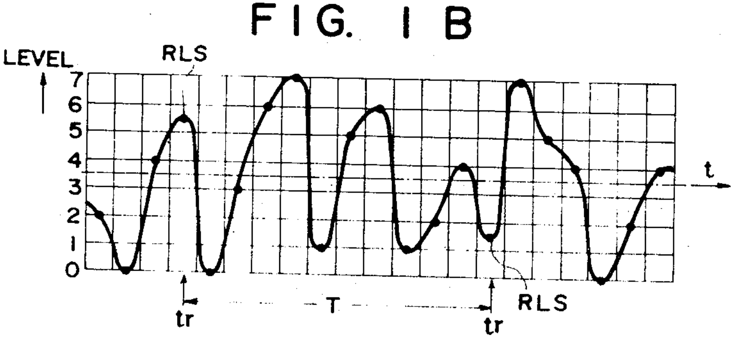

For efficient digital signal transmission by the reduction of the bandwidth necessary for the transmission, the digital signal is usually transmitted in the form of a multilevel signal. FIG. 1 illustrates one example of a multilevel signal to be transmitted, for example, an octal signal, in which the abscissa represents time and the ordinate represents level and RLS indicates a reference level signal. Generally, the level of the multilevel signal to be transmitted is generated at random and, for example, a binary reference level signal RLS is inserted into the multilevel signal at predetermined intervals T of the repetitive cycle of the multilevel signal. When transmitted through a transmission line, such a waveform as depicted in FIG. 1A becomes smoothed by bandwidth restriction as shown in FIG. 1B. In FIG. 1B, the levels at the sampling times of the multilevel signal lie at correct level points and the resulting waveform is restricted in band according to the Nyquist theorem, but the received waveform is generally deformed by linear distortion of the transmission line and the levels themselves also change.

Figure 2:
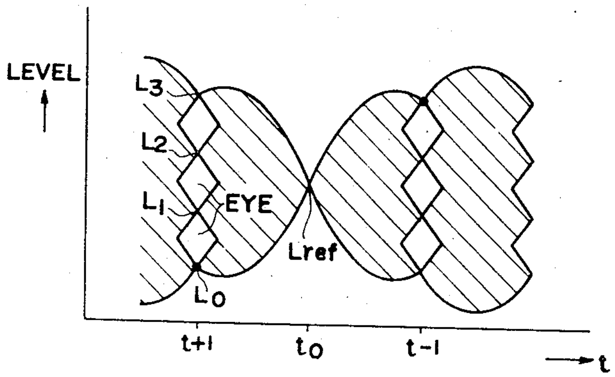
FIG. 2 shows an ideal "eye" pattern for a quarternary signal transmitted as a multilevel signal and received on the receiving side.

For examining the possibility of multilevel decoding in view of the deformation of the received signal due to distortion of the transmission line, a figure commonly referred to as an "eye" pattern is prepared. FIG. 2 illustrates an "eye" pattern in an ideal condition when a unitary reference level signal according to this invention has been inserted in a quarternary signal, the abscissa representing time and the ordinate signal level. In FIG. 2, L0 to L3 indicate the levels of the quarternary signal, Lref the level of the reference level signal RLS and EYE the "eye" opening of the "eye" pattern. On the assumption that the reference level signal RLS is received at a time $t0$, the multilevel signal has a desired one of the four levels at a time $t+1$ or $t-1$ before or after $t0$. In an ideal case where the multilevel of the received waveform is not deformed, the received waveform which passes the levels L0 to L3 at the time $t+1$ or $t-1$ and the level Lref at the time to. Therefore, an area in which the received waveform does not exist, that is, an "eye" opening EYE lies in the neighborhood of the level points. The received waveform may exist only in the area indicated by oblique lines.

The presence of the above-mentioned "eye" opening EYE is indispensable to the decoding of the transmitted multilevel from the received waveform. Namely, a threshold level is selected at an intermediate level point of the eye opening EYE, by which it is the discrete levels (L0 or L1) of the transmitted multilevel. In the case of FIG. 2, the level Lref of the reference level signal to be inserted according to this invention is selected midway between the levels L1 and L2.

Figures 3A, 3B:
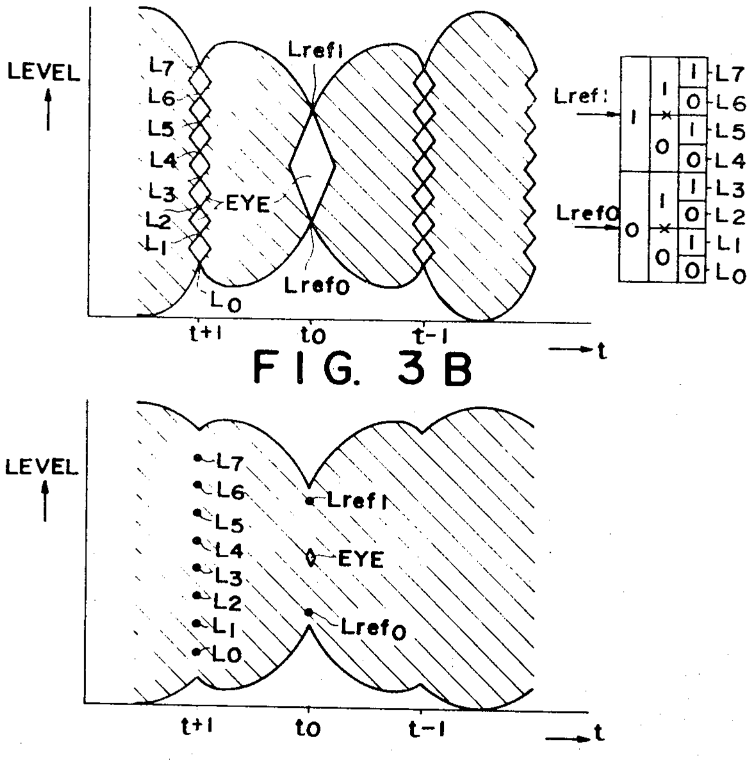
FIG. 3A shows an ideal "eye" pattern for the octal signal transmitted as a multilevel signal and received on the receiving side.
FIG. 3B shows an "eye" pattern in a condition that the "eye" opening for multilevel decoding has been removed by linear distortion of the transmission line.

FIG. 3A shows an "eye" pattern in an ideal condition when a binary reference level signal according to this invention has been inserted in an octal signal. In the FIG., L0 to L7 indicate eight levels of the multilevel signal, Lref0 and Lref1 indicate the two levels of the reference level signal and EYE refers to an "eye" opening similar to that depicted in FIG. 2. On the right of FIG. 3A, there is shown the manner of establishment of the levels L0 to L1 and those Lref0 and Lref1 of the reference level signal. Namely, when represented in binary numbers, the eight levels are [000], [001], [010], [011], [100], [101], [110]and [111], but the levels Lref0 and Lref1 of the reference level signal are selected at transition points of the binary digits, which are employed for determination of the polarity of an error. That is, in the illustrated example, the level Lref0 is selected at a point where the binary digit of the central position changes from 0 to 1, as indicated by crosses "X." The reasons for this will be described later on.

FIG. 3B shows the case where the level of the received signal has been varied by the distortion of the transmission line and the "eye" opening depicted in FIG. 3A has been almost removed. In the absence of the eye opening as shown in FIG. 3B the multilevel decoding is impossible. Namely, when the received signal exists, for example, between the levels L0 and L1 in FIG. 3B, it is impossible to judge whether a signal of the level L0 lies at the intermediate position under the influence of positive intersymbol interference of a signal of the level L1 lies at that position under the influence of negative intersymbol interference. However, the reference level signal according to this invention has a small number of levels, so that the "eye" opening of the reference level signal usually remains open, even if slightly, and can be employed as the reference. Even when the "eye" opening is closed, the levels Lref0 and Lref1 can be correctly decoded and intersymbol interference with the reference level signal can be detected.

The intersymbol interference herein mentioned is such interference that a predetermined number of signals before and after a signal being transmitted cause a change in the level of the latter owing to distortion of the transmission line and the influence of the interference will be described in detail later on.

Figure 4:
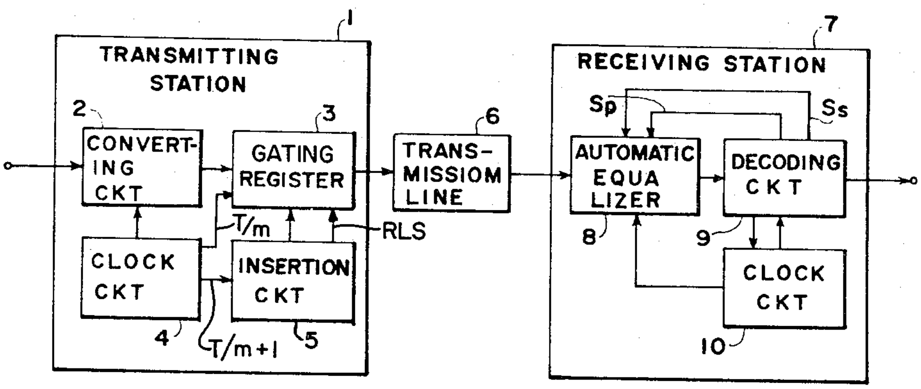
FIG. 4 illustrates in diagram block form the construction of an automatic equalization system for multilevel signal transmission in accordance with the teachings of this invention.

FIG. 4 illustrates the overall arrangement of one illustrative example of this invention in which automatic equalization is achieved for correct multilevel decoding, even if the "eye" pattern deteriorates as shown in FIG. 3B. In FIG. 4, reference numeral 1 indicates a transmission station or means, 2 a binary multilevel converting circuit for converting a digital signal into a multilevel signal, 3 a gating register for inserting a reference level signal in the multilevel signal on a predetermined cycle, 4 a clock circuit, 5 a reference level signal insertion controlling circuit for controlling the buffer register 3, 6 a signal transmission line, 7 a receiving end station or means, 8 an automatic equalizer, 9 a multilevel decoding circuit, and 10 a clock circuit on the receiving side. Ss designates a polarity bit signal representing the polarity of a received signal and Sp an error polarity bit signal representing the polarity of a deviation of the received signal from a predetermined level, that is, an error of the signal.

In the transmission station 1 the binary-multilevel converting circuit 2 converts a digital signal for transmission into a multilevel signal under the control of the clock circuit 4. The binary-multilevel converting circuit 2 is a known one and the principles of its operation may be considered such as those of a D-A converter which converts a digital signal written in series into an analog signal. Then, the multilevel signal is written in the gating register 3 and a reference level signal is inserted under the control of the insertion circuit 5 into the multilevel signal on a predetermined cycle, as will be described later, after which the multilevel signal with the reference level signal inserted therein is sent out into the transmission line 6 in such a form as depicted in FIG. 1A. The transmission system in the transmission line 6 may be a base band system or a modulation system as long as the signal to be transmitted is a base band signal at the input and output ends of the transmission line 6. Linear distortion of the transmission line 6 causes deterioration of the "eye" pattern as previously described. The received signal is equalized by an adjusting means such as the automatic equalizer 8 which follows the principles of, for example, a transversal filter and the signal is read out as a correct multilevel signal by the multilevel decoding circuit or detection means 9. The polarity bit Ss and the error polarity bit Sp of the received signal detected by the multilevel decoding circuit 9 are fed back to the automatic equalizer 8 and used for adjustment of the automatic 12 equalizer 8 to make corrective changes in the level of subsequent received signals due to intersymbol interference therewith. A clock signal is generated by the clock circuit 10.

It is preferred to arrange the reference level signal such that its "eye" opening is not lost by the intersymbol interference due to the distortion of the transmission line as previously described. To this end, the number of the levels of the reference level signal is selected to be smaller than that of the multilevel signal to be transmitted.

Figure 5A:
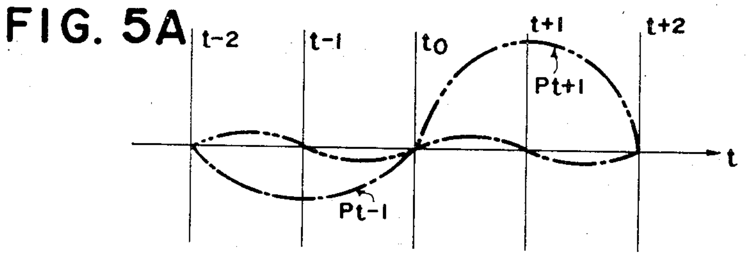
FIG. 5 shows graphs for explaining intersymbol interference with a signal positioned at a time T0, FIG. 5A showing the condition in which the signal is free from intersymbol interference and FIG. 5B the condition in which the signal is affected by intersymbol interference.
Figure 5B:
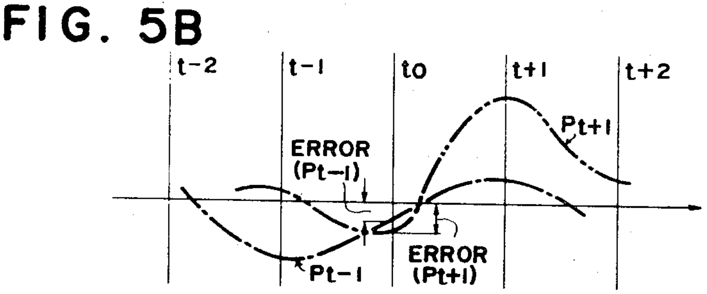

A brief description will be given of the principles of the automatic equalizer 8. FIGS. 5A and 5B show diagrams for explaining the intersymbol interference, in which interference by only two adjacent signals is shown for the sake of brevity, FIG. 5A showing the case where no intersymbol interference exists and FIG. 5B showing the case where interference exists. Based upon an error (a level change) at a time slot $t0$, intersymbol interference by signals present at time slots $t-1$ and $t+1$ on both sides of $t0$ is considered. Generally, a signal is naturally present at the time slot $t0$, but it is omitted because only intersymbol interference by the signals before and after it is considered. In FIGS. 5A and 5B, Pt+1 designates a signal received at the time slot $t+1$ and Pt−1 designates a signal received at the time slot $t-1$.

In FIG. 5A, the signals Pt+1 and Pt−1 are both smoothed in waveform but merely exert an influence of zero amplitude at the time slot $t0$; in other words, they do not cause any level change in the signal detected at the sampling time $t0$. Under such conditions, no intersymbol interference exists. In FIG. 5B, the positive signal Pt+1 produces a minus error in the time slot $t0$ and the negative signal Pt−1 also produces a minus error in the time slot $t0$.

Accordingly, correction of the errors with the automatic equalizer may be achieved by adjusting the attenuator of the equalizer in a positive direction (a direction in which the positive signal Pt+1 is added to the error detected at the time $t0$) after the positive signal Pt+1 is advanced to the time $t0$ and by similarly adjusting the attenuator in a negative direction (a direction in which the negative signal Pt−1 is added to the error detected at the time $t0$ in opposite polarities) after the signal Pt−1 is delayed to the time $t0$. Also with respect to the received signal present at the time slot $t0$, it is sufficient to add the errors in a manner to correct them.

By sequentially achieving such an error correcting operation as above described, the overall transmission line including the automatic equalizer can be approximated to a transmission line free from intersymbol interference. The following Table 1 shows the above error correcting operation in connection with the polarity of the signal (detected with the polarity bit Ss) and that of the error (detected with the error polarity bit Sp).

TABLE 1

| Error polarity (Sp) | Signal polarity (Ss) | Control direction |
|---|---|---|
| − | − | − |
| − | + | + |
| + | − | + |
| + | + | − |

It will be seen that when (+) is represented as 1 and (−) as 0, the control direction agrees with that of the output from the modulo 2 adder.

FIG. 5B illustrates the case where errors ERROR (Pt+1) and ERROR (Pt−1) caused by the signals Pt+1 and Pt−1, respectively, with respect to the time slot *t*0 are of the same polarity. In practice, however, there are some occasions when the two errors ERROR(Pt+1) and ERROR (Pt−1) are opposite in polarity to each other. In this case, the polarity of the composite error detected as a result of addition of the two errors is different from that of one of the errors and the correction according to the rule of Table 1 is considered insufficient. However, it will be seen that, also in such a case, the attenuator is controlled in a direction to eliminate the larger error of the errors making up the composite error. Consequently, assuming that the levels of the multilevel signal are generated at random, the control signal by the output from the modulo 2 adder can be obtained correctly by ascertaining the correlation of the levels for a long period of time and the equalizer is controlled correctly. The automatic equalizer of the above principles will be described in detail in connection with FIG. 8.

Figure 6A:
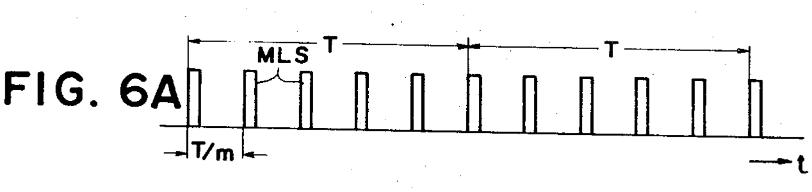
FIGS. 6A and 6B show diagrams, for explaining the insertion of a reference level signal on the transmitting side.
Figure 6B:
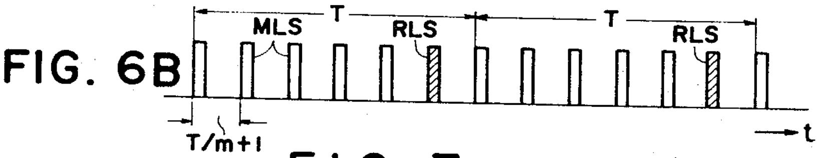
Figure 7:
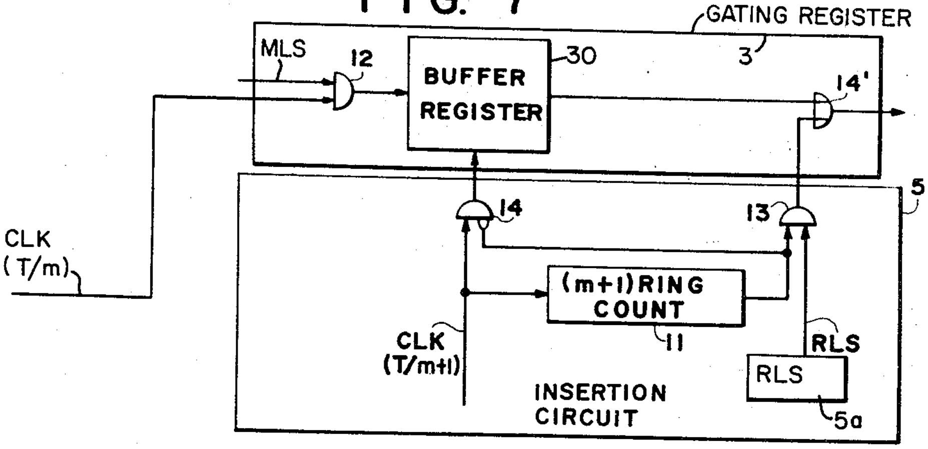
FIG. 7 is a detailed diagram showing a reference level signal insertion circuit for use in this invention.

FIGS. 6A and 6B, and 7, respectively, show the principle of the operation and the detailed constructions of the gating register 3 and the control circuit 5 employed in FIG. 4. In the FIGS. 6A and 6B, and 7, RLS indicates a reference level signal (of two values) to be inserted according to this invention; MLS indicates a multilevel signal to be transmitted; CLK refers to a clock signal; T specifies a desired interval of time; and *m* designates a desired integer. Numeral 5*a* represents the source of the RLS, numeral 11 designates an (*m*+1) ring counter; 12 and 13 identify AND gate circuits; and numeral 14 identifies an AND gate circuit having a "not" input, and numeral 30 identifies a buffer register.

As shown in FIGS. 6A and 6B, and 7, the multilevel signal MLS of, for example eight values, is written in the buffer register 30 of the gating register 3 through the AND gate circuit 12 by the clock signal CLK (T/m) having a repetitive cycle T/m derived from the clock circuit 4 as shown in FIG. 4. Namely, an *m* number of signals MLS are written in the interval of time T. Then, the *m* number of signals MLS written in the buffer register 30 are read out by a clock signal CLK(T/*m*+1) of a repetitive cycle T/*m*+1 through the AND gate circuit 14 except when inhibited by the ring counter 11. Accordingly, the reading of the multilevel signals MLS is interrupted for an interval of time T/*m*+1, upon occurrence of the output signal (at the time of carry) of the ring counter 11, once in the period of time T, as shown in FIG. 6. At intervals of time T/*m*+1, the binary reference level signal RLS is enabled through the AND gate circuits 13 and 14. As previously described, the reference level signal RLS has fewer levels than the multilevel signal to be transmitted, and serves to open the "eye" opening EYE even in the presence of intersymbol interference as depicted in FIG. 3B. Then, intersymbol interference with the reference level signal RLS inserted in the multilevel signal MLS at the predetermined time intervals T is detected at the receiving station 7 and the attenuator of the automatic equalizer 8 is adjusted in a direction to eliminate the intersymbol interference.

Figure 8B:
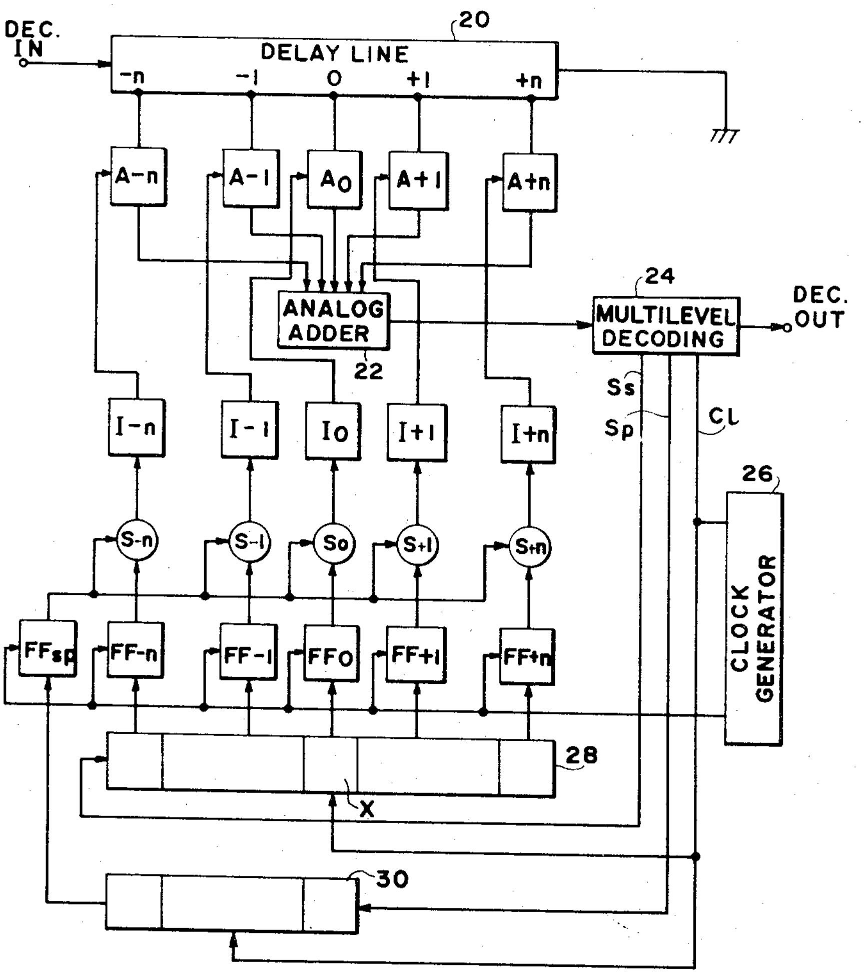
FIGS. 8A and 8B show illustrative embodiments of the construction of an automatic equalizer on the receiving side which is used in this invention.
Figure 8A:
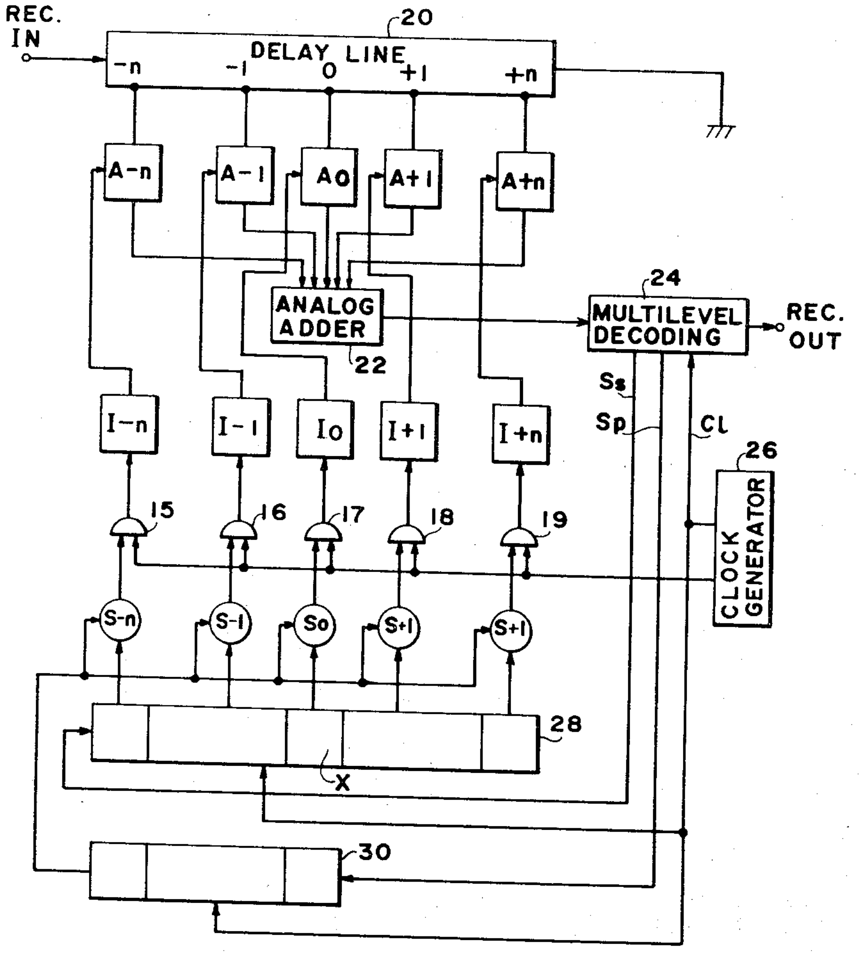

FIG. 8A illustrates in detail the automatic equalizer 8 for automatic equalization of the transmission line 6 by making use of the reference level signal RLS which is inserted in the multilevel signal MLS at the predetermined time intervals T as above described. In FIG. 8, REC.IN designates a multilevel signal input terminal of the base band in the receiving station 7, and the numeral 20 refers to a tapped delay line having taps −*n* to +*n*, the tap 0 being a main signal tap and those +1 to +*n* and −1 to −*n* echo taps, respectively. The delay time between adjacent taps is equal to the repetitive cycle T/*m*+1 of the clock signal CLK(T/*m*+1). A−*n* to A+*n* indicate attenuators which are shown in detail in FIG. 12; numeral 22 identifies an analog adder depicted in detail in FIG. 10; numeral 24 indicates a multilevel decoding circuit shown in detail in FIG. 13; I−*n* to I+*n* refer to integrator circuits illustrated in detail in FIG. 11; numeral 26 identifies a clock signal generator for producing a clock signal of a repetitive cycle T/*m*+1; S−*n* to S+*n* refer to modulo 2 adders shown in detail in FIG. 9; numeral 28 designates a shift register of 2*n*+1 stages for storing the polarity bit Ss; numeral 30 refers to a shift register of *n*+1 stages for storing the error polarity bit Sp; and REC.OUT a multilevel signal output terminal. Numerals 15 to 19 indicate AND gate circuits.

The received signals (such as depicted in FIG. 1B) which are transmitted through the transmission line 6 shown in FIG. 4, are applied to the input terminal REC.IN and propagated through the delay line 20, imparting a delay to provide delayed signals. The delayed signals are derived from the taps −*n* to +*n* of the delay line 20 and are applied to the attenuators A−*n* to A+*n*, respectively. In turn, the attenuated signals are applied to the analog adder 22 where the signals are added together to produce a composite signal. The composite signal derived from the analog adder 22 is applied to the multilevel decoding circuit 24 where the signal level of the composite signal is detected and fed to the output terminal REC.OUT.

The polarity bit Ss and the error polarity bit Sp of the received signal, which are obtained in the multilevel decoding circuit 24, are set in the shift registers 28 and 30, respectively, and shifted by a clock signal C1. At the time when the error polarity bit Sp of the reference level signal RLS appears at the output terminal of the shift register 30, the polarity bit Ss of the reference level signal RSL lies at a position indicated by a letter X in the shift register 28. The polarity bits Ss of the multilevel signal MLS positioned before and after the reference level signl RLS also lie before and after the position X in the shift register 28. The modulo 2 adders S−*n* to S+*n* calculate the exclusive "OR" of the polarity bit Ss and the error polarity bit Sp of the reference level signal RLS, respectively. Wnen the error polarity bit SP of the reference level signal appears at the output terminal of the shift register 30, the AND gate circuits 15 to 19 are enabled by the clock signal C1 derived from the clock signal generator 26, and the outputs from the modulo 2 adders S−$n$ to S+$n$ at this time are applied to the integrator circuits I−$n$ to I+$n$. With the outputs from the integrator circuits I−$n$ to I+$n$, the attenuators A−$n$ to A+$n$ are controlled.

The attenuators A−$n$ to A+$n$ are controlled such that when the codes of the outputs from the integrator circuits I−$n$ to I+$n$ are 1, the received signals appearing at the taps −$n$ to +$n$ of the delay line 20 are increased while being held with one another in-phase, and when the codes of the integrator outputs are 0, the received signals are increased but in reversed phase.

Namely, when the AND gate circuits 15 to 19 are enabled, the modulo 2 adders S−$n$ to S+$n$ derive outputs corresponding to the intersymbol interference with the reference level signal RLS, and the attenuators A−$n$ to A+$n$ are adjusted to remove the intersymbol interference components. The adjustment of the attenuators A−$n$ to A+$n$ is carried out for those signals which are delayed behind the aforementioned reference level signal RLS. The automatic equalization system of this invention utilizes the principles that by extracting intersymbol interference with the reference level signals from sequentially received signals and adjusting the equalizer to remove the intersymbol interference from subsequent signals, the transmission line becomes gradually equalized to be free from the intersymbol interference.

FIG. 8B illustrates a modified form of the automatic equalizer for automatic equalization of the transmission line, in which similar elements to those in FIG. 8A are identified by the same reference numerals and characters. The embodiment of FIG. 8B is different from that of FIG. 8A in the employment of flip-flop circuits FFsp, and FF−$n$ to FF+$n$ in place of the AND gate circuits 15 to 19.

The polarity bits Ss of the received signals and the error polarity bits Sp of the reference level signals RLS are sequentially supplied to the shift registers 28 and 20, respectively, as is the case with the embodiment of FIG. 8A. In the embodiment of FIG. 8B, when the error polarity bit Sp of the reference level signal RLS appears at the output terminal of the shift register 30, this error polarity bit Sp is set in the flip-flop circuit FFsp and the polarity bits Ss of the received signals shifted in the shift register 28 are set in the flip-flop circuits FF−$n$ to FF+$n$, respectively. At this time, the polarity bit Ss of the reference level signal RLS lies at a position indicated by X in FIG. 8B, as is the case with the embodiment of FIG. 8A.

The error polarity bit Sp set in the flip-flop circuit FFsp is applied to the modulo 2 adders S−$n$ to S+$n$ connected in common thereto and the polarity bits Ss set in the flip-flop circuits FF−$n$ to FF+$n$ are applied to the modulo 2 adders S−$n$ to S+$n$ corresponding thereto. Consequently, when the error polarity Sp of the reference level signals RLS appears at the output terminal of the shift register 30, the exclusive "OR" signals calculated by the modulo 2 adders S−$n$ to S+$n$ are applied through the integrator circuits I−$n$ to I+$n$ to the attenuators A−$n$ to A+$n$ to adjust them as in the case of FIG. 8A. At the next time, the flip-flop circuits FFsp, and FF−$n$ to FF+$n$ are reset to stand by until the error polarity bit Sp of the subsequent reference level signal RLS appears at the output terminal of the shift register 30.

Figures 9, 10, 11, 12, 13:
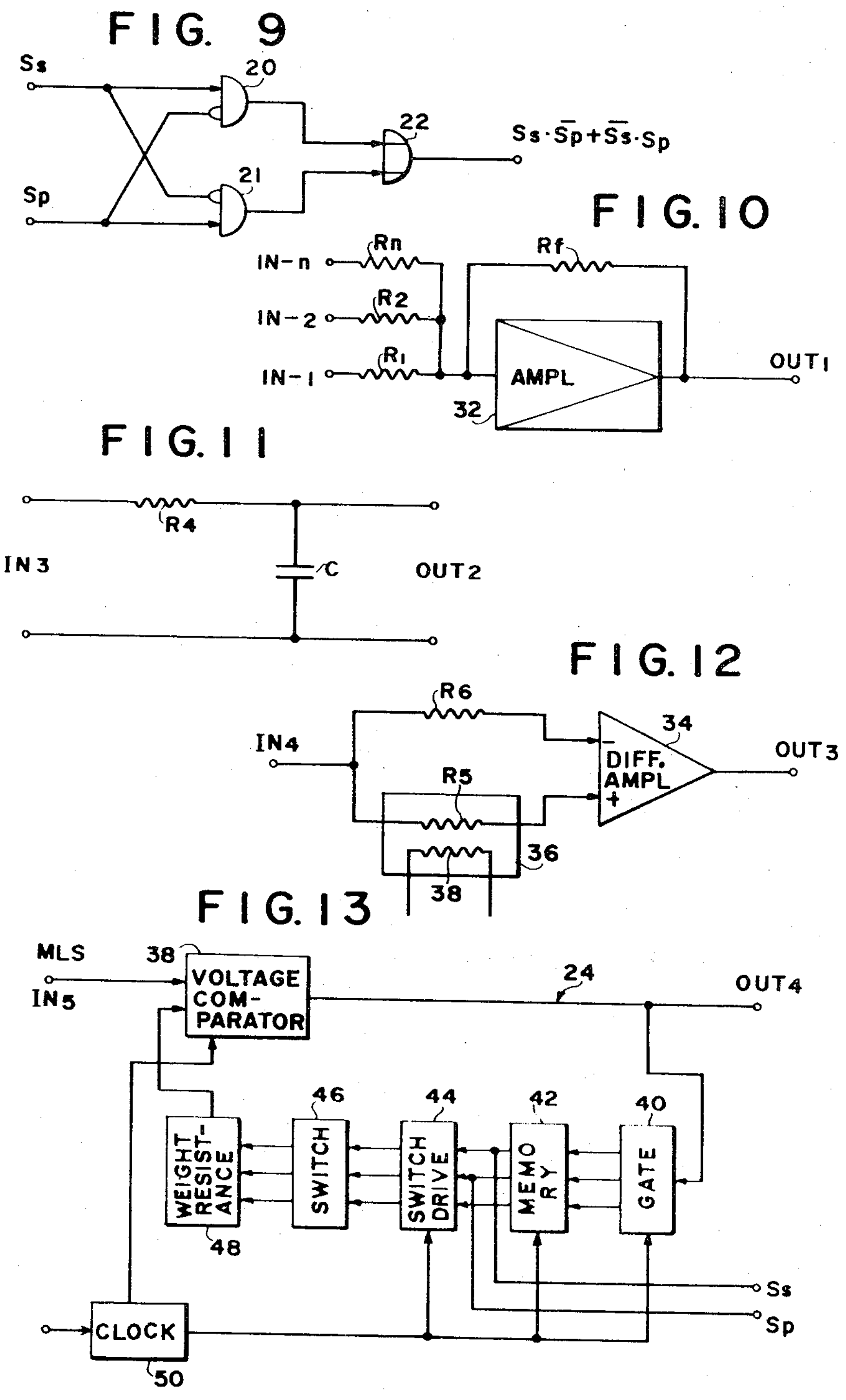
FIG. 9 illustrates one illustrative embodiment of a modulo 2 adder for use in the automatic equalizer.
FIG. 10 shows one example of an analog adder for plural input signals which is employed in the automatic equalizer of this invention.
FIG. 11 shows one example of an integration circuit for use in the automatic equalizer of this invention.
FIG. 12 illustrates one example of a variable attenuator for use in the automatic equalizer of this invention.
FIG. 13 illustrates one example of a multilevel decoding circuit for use in the automatic equalizer of this invention.

In FIG. 9, there is shown an illustrative embodiment of the modulo 2 adders S−$n$ to S+$n$ employed in the foregoing automatic equalizers shown in FIGS. 8A and 8B. Numerals 20 and 21 indicate AND gate circuits having a "not" input, and numeral 22 indicates an OR gate circuit. As above described, the exclusive "OR" signals of the polarity bits Ss at the taps of the shift register 28 and the error polarity bit Sp of the reference level signal RLS appearing at the output terminal of the shift register 30 are calculated by the circuit shown in FIG. 9.

FIG. 10 illustrates an illustrative embodiment of the analog adder 22 employed in FIGS. 8A and 8B. IN−1, IN−2 and IN−$n$ designate input terminals which are supplied with the outputs from the attenuators A−$n$ to A+$n$; in the FIG., only three input terminals are shown for the sake of brevity. Numeral 32 indicates an operational amplifier; OUT 1 refers to an output terminal connected to the multilevel decoding circuit 24; R1, R2 and Rn designate input resistors; and Rf identifies a feedback resistor. If voltages supplied to the input terminal IN−1, IN−2 and IN−$n$, and that at the output terminal OUT 1 are taken as $e1$, $e2$, $en$ and $e0$, respectively, the voltage $e0$ is expressed by the following equation:

$$e0 = Rf/R1\ e1 + Rf/R2\ e2 + Rf/Rn\,en$$

If R1 = R2 = Ri, the voltage $e0$ is as follows:

$$e0 = Rf/Ri\ (e1 + e2 + en)$$

and the sum of the voltages at the input terminals is derived at the output terminal OUT1.

In FIG. 11, there is illustrated an illustrative embodiment of the integrator circuits I−$n$ to I+$n$ used in the automatic equalizers of FIGS. 8A and 8B. IN−3 designates input terminals to which is supplied the outputs from the AND gate circuits 17 to 21; OUT 2 refers to output terminals coupled to the attenuators A−$n$ to A+$n$; R4 identifies a resistor and C identifies a capacitor. The capacitor C is charged at a rate R4 × C by a voltage supplied to the input terminal IN−3, to provide at the output terminal OUT 2 taken from the capacitor C an output signal corresponding to the integrated input signal.

FIG. 12 shows an illustrative embodiment of the attenuators A−$n$ to A+$n$ employed in the automatic equalizers of FIGS. 8A and 8B. IN−4 identifies an input terminal connected to one of the taps of the delay line 20; OUT 3 refers to an output terminal coupled to the analog adder 22; numeral 34 identifies a differential amplifier; numeral 36 designates an indirectly heated thermistor; R5 refers to a thermistor resistor and numeral 38 represents a heater. The heater 38 is connected to the output terminals of the integrator circuits I−$n$ to I+$n$ to change the resistance value of the thermistor resistor R5. In the embodiment of FIG. 12, three outputs, that is, positive, zero and negative outputs, are derived at the output terminal OUT 3 depending upon the resistance value of the termistor resistor R5 relative to that of the resistor R6.

FIG. 13 illustrates an illustrative, block diagram of the multilevel decoding circuit 24 employed in the automatic equalizers of FIGS. 8A and 8B. IN−5 indicates an input terminal coupled to the output of the analog adder 22 (the multilevel signal of the base band); the numeral 38 represents a voltage comparator circuit for comparing the input signal with a predetermined level; OUT 4 refers to an output terminal for output signals decoded into multilevel signals; numeral 40 identifies a gate circuit; numeral 42 represents a memory circuit such, for example, as a flip-flop circuit for memorizing the output from the gate circuit 40; and numeral 44 designates a switch drive circuit for controlling a switch circuit 46 in accordance with the output from the memory circuit 42. The switch circuit 46 supplies a constant current to a weight resistance circuit 48. A clock circuit 50 applies clock signals to each of the circuits 40, 42 and 38.

The multilevel decoding circuit 24 shown in FIG. 13 is a known circuit commonly referred to as a feedback type encoder and its operation will be briefly described. A reference voltage is applied to one input terminal of the voltage comparator circuit 38, having a reference level determined as shown on the right side of FIG. 3A so that its comparison reference point is at first selected at the transition point of binary digit of first position (that is, the most significant digit corresponding to the level position where 0 changes to 1). When an input signal is impressed on the input terminal IN—5, a 1 or 0 is produced according to whether the level of the input signal is above or below the aforementioned comparison reference point. If, now, the input signal has a level L5, a 1 is produced. The output 1 of the first position is also applied to the gate circuit 40, whose output is fed through a lead corresponding to the most siginificant digit to the memory circuit 42 to memorize therein the output 1 of the first position. The memory circuit 42 applies a 1 to its corresponding lead of the most significant digit to control the weight resistance circuit 48 through the switch drive circuit 44 and the switch circuit 46. As a result, the comparison reference point of the voltage comparator circuit 38 is increased by ½ level and is set at the transition point of the second position from 0 to 1 as indicated by a cross (X) in FIG. 3A. Then, the input signal of the level L5 is compared with the set comparison reference point to derive an output 0 at the output terminal OUT 4. This output 0 is applied by the gate circuit through a second lead to be memorized in the memory circuit 42. The memory circuit 42 controls the weight resistance circuit 48 through the switch drive circuit 44 and the switch circuit 46 by means of the second lead. As a result, the comparison reference point of the voltage comparator circuit 38 is lowered by ½ level of the second position and set at the intermediate point between the upper levels L4 and L5 of the third position in FIG. 3A, i.e., at the transition point from 0 to 1. Then, the output signal of the level L5 is compared with the set comparison reference point to derive the output 0 at the output terminal OUT 4. This output is applied through the gate circuit 40 and the third lead to be memorized in the memory circuit 42, and is used for selecting the bit output 1 or 0 of the fourth position. In the case of a signal of 8-unit level, the bit output as far as the fourth digit is detected as if the signal is of 16-unit level and an output of 8-unit, that is, three-bit is put to use.

In this case, it will be understood from the comparison standard shown in FIG. 3A that the polarities of the received reference level signal and of the multilevel signal are detected with the aforesaid detected first position output. Namely, even if a signal of the level L5 is received while being subjected to a slight level change, the polarity of the signal of the level L5 will be judged to be 1 from the aforementioned comparison standard. Consequently, the received signal of the level L5 is regarded as positive. It will be seen that since the signal 1 is applied to the first lead of the memory circuit 42 shown in FIG. 13, the output from this lead can be used as a polarity bit.

On the other hand, it will be understood that the error polarity of the reference level signal RLS, that is, the polarity of a deviation of the signal from a predetermined level is such that in the case of 1, a level change is caused in the positive polarity and in the case of 0 a level change is caused in the negative polarity, since the level of the reference level signal is selected at the transition points of binary digit Lref0 and Lref1 of the second position in FIG. 3A. Namely, in the case where the reference level signal is not subjected to a level change by the intersymbol interference due to adjacent multilevel signals, the memory circuit 42 memorized 1 or 0 at the same frequency. While, when the reference level signal is subjected to a positive level change, the memory circuit 42 memorized 1 at greater frequency and the output Sp of the second position is sequentially set in the shift register 30, depicted in FIG. 8A or 8B. As a result, a similar change in subsequent signals is corrected by the attenuators A—*n* to A+*n*. Further, when the reference level signal is subjected to a negative level change, the frequency of memorizing 0 is great, with the result that the similar changes in subsequent signals are corrected by the attenutors A—*n* to A+*n*.

The level of the reference level signal RLS is not limited specifically to the transition point of binary digit of the second position. Generally, the level of the reference level signal can be selected irrespective of the particular levels of the multilevel signal and it is possible to detect with an error polarity detector whether the level change of the reference level signal is positive or negative.

It is a great advantage that by selecting the level of the reference level signal to be in agreement with the threshold level of the multilevel decoder for the multilevel signal, that no special means are required for error polarity detection.

In FIGS. 8A and 8B, when the error polarity signal Sp of the reference level signal is derived at the output terminal of the shift register 30, the exclusive "OR" signals are applied to the integrator circuits I—*n* to I+*n* by the AND gate circuits 15 to 19, and the flip-flop circuits FFsp and FF—*n* to FF+*n*, respectively. The operation is carried out for extracting the intersymbol interference component with the reference level signal RLS. However, where the levels of the multilevel signals to be transmitted are fully random, it is also possible to delete the AND gate circuits 15 to 19 and the flip-flop circuits FFsp, FF—*n* to FF+*n* and to supply inputs to the integrator circuits I—*n* to I+*n* at all times. Namely, in the event that the levels of the multilevel signals are fully random, and even if inputs based upon the intersymbol interference between the multilevel signals are applied to the integrator circuits I—*n* to I+*n* at every moment, the integrated outputs derived therefrom after integration of the inputs for a predetermined period of time may be zero, and hence do not matter. However, the intersymbol interference between the reference level signal RLS and the neighboring multilevel signals does not result in a zero integrated output signal because the level of the reference level signal is not random, and the resulting integrated output is used for adjustment of the attenuators.

The automatic equalizers of FIGS. 8A and 8B are described above are of the zero-forcing type but a mean square type automatic equalizer can be applied to this invention. The mean square type automatic equalizer may be considered such that, for example in FIGS. 8A and 8B, the polarity bit Ss and the error polarity bit Sp of the received signal are detected before the adjustment of the attenuators A−*n* to A+*n* and are used to extract the intersymbol interference as in the examples of FIGS. 8A and 8B to enable the attenuators A−*n* to A+*n* to be adjusted.

In the present invention as described above, a uniform reference level signal is inserted in a train of multilevel signals of random levels and the level of the reference level signal is detected on the receiving side to extract intersymbol interference with the reference level signal, by which attenuators are adjusted in a direction to prevent level changes in subsequently received signals, and to equalize thereby the intersymbol interference for an extended period of time. Therefore, as long as the level of the reference level signal can be detected on the receiving side, equalization draw-in can be achieved, thereby avoiding the drawbacks of the conventional adaptive type and preset type automatic equalizers. For inserting the reference level signal RLS in the multilevel signal MLS, the difference between writing and reading speeds is utilized to provide a certain vacant time at predetermined time intervals T, so that the desired purpose can be attained by relatively simple means. Further, when the level of the reference level signal is set at the transition point of binary digit of a desired position in the case of representing the multilevel of the multilevel signal in the form of binary numbers, the error polarity of the reference level signal can be readily detected. Other advantages of this invention will be easily understood from the foregoing examples of this invention.

Numerous changes may be made in the above-described apparatus and the different embodiments of the invention may be made without departing from the spirit thereof; therefore, it is intended that all matter contained in the foregoing description and in the accompanying drawings, shall be interpreted as illustrative and not in a limiting sense.

What is claimed is:

1. Apparatus for transmitting a multilevel signal having a given number of levels over a transmission line having input and output terminals, said apparatus comprising:

a. transmission means coupled to the input terminal of the transmission line, said transmission means including reference means for providing a reference level signal having a fewer number of defined levels than the given number and inserting means for inserting the reference level signal in a train of the multilevel signals at predetermined time intervals and for transmitting the train of the multilevel signals and inserted reference level signal; and b. receiving means coupled to the output terminal of the transmission line, said receiving means including detection means for receiving transmitted multilevel signals and reference level signal and for detecting the intersymbol interference imposed by the transmission line on the reference level signal due to the adjacent multilevel signals, and adjustment means responsive to the detected intersymbol interference for correcting the intersymbol interference imposed upon the multilevel signal.

2. Apparatus as claimed in claim 1, wherein said adjustment means includes a transversal filter.

3. Apparatus as claimed in claim 2, wherein said transversal filter is of the zero-forcing type.

4. Apparatus as claimed in claim 2, wherein said transversal filter is of the mean-square type.

5. Apparatus as claimed in claim 1, wherein said transmission means includes:

storage means;

clock means for generating a first, repetitive clock signal at intervals of T/*m*, where T is a predetermined interval of time and *m* is a predetermined integer and for generating a second, repetitive clock signal at an interval of T/(*m*+1);

storing means responsive to the first clock signal for storing in said storage means a train of the multilevel signals;

reference means responsive to the second clock signal for retrieving from said storage means a train of the multilevel signals and for providing the reference level signal; and inserting means for inserting at time intervals of T the reference level signal into the train of multilevel signals retrieved from said storage means and for transmitting the train of the multilevel signals and inserted reference level signal.

6. Apparatus as claimed in claim 1, wherein the levels of the multilevel signals to be transmitted are representative of a binary number of *n* bits where *n* is a predetermined integer, said transmission means including means for providing a reference level signal of a selected magnitude at a transition point of a binary digit of a selected position of the *n* bits.

7. Apparatus as claimed in claim 6, wherein detection means for detecting the train of the transmitted multilevel signals and the injected reference level signal to provide an output signal representing in binary number form the most significant digit of the *n* bits and for detecting the polarity of the error of the transmitted reference level signal with respect to a predetermined level to provide an output signal representing in binary number form said selected position.

8. Apparatus as claimed in claim 7, wherein said detection means comprises:

shift register means having a predetermined position;

means for sequentially storing in said shift register means the binary output signals representative of the transmitted reference level signal and the multilevel signals transmitted before and after the transmitted reference level signal;

storage means for receiving and storing the error polarity binary signal;

calculation means responsive to the shifting of the error polarity binary signal to said predetermined position in said shift register means for calculating the exclusive "ORs" of the binary output signals representative of the transmitted multilevel signals and the error polarity binary signal representative of the transmitted reference level signal error to provide correction signals for diminishing the intersymbol interference imposed on the transmitted multilevel signal.

9. Apparatus as claimed in claim 8, wherein there is included equalizer means comprising a delay line having a plurality of output taps, a plurality of adjustable attenuators coupled to corresponding output taps of said delay line, said attenuators being coupled to receive the correction signals for adjusting the attenuators to substantially reduce the intersymbol interference imposed upon the transmitted multilevel signals.

10. Apparatus as claimed in claim 1, wherein said receiving means includes:

delay means for sequentially receiving the transmitted reference level signal and the transmitted multilevel signals and having a main output signal tap and a plurality of echo output taps;

a plurality of adjustable attenuator means coupled to corresponding taps of said delay means, each of said attenuator means having an output terminal;

adding means coupled to each output terminal of said attenuator means for adding the output signals thereof to provide a composite signal;

a multilevel decoding circuit coupled to receive the composite signal for providing polarity bit signals indicative of the transmitted multilevel signals and the reference level signal and error polarity bit signals indicative of the error polarity of the reference level signal with respect to a predetermined level;

first and second shift registers for receiving and storing polarity bit signals indicative of the transmitted multilevel signals and the error polarity bit signal of the reference level signal, respectively;

said first shift register having a number of stages corresponding to the number of said attenuators, said second shift register having a number of stages corresponding to said main signal tap and said echo taps;

a plurality of calculating circuits responsive to the shifting of the error polarity bit signal of the reference level signal to the output terminal of said second shift register, for calculating the exclusive "ORs" of the polarity bit signals of the multilevel signals as stored in the various stages of said first shift register and the error polarity bit signal of the reference signal appearing at the output terminal of said second shift register; and a plurality of integrating circuits coupled to the corresponding calculating circuits for providing integrated output signals to be applied to the corresponding attenuator means.

11. A method of transmitting, receiving and decoding multilevel signals having a predetermined number of levels over a transmission line imparting intersymbol interference to the transmitted multilevel signal, said method comprising the steps of:

providing a reference level signal having a fewer number of defined levels than the given number;

inserting repetitively in a first train of the multilevel signals at a predetermined time interval the reference level signal to provide a second train of signals with the reference level signal inserted therein;

transmitting the second train of the multilevel signals with the reference level signal imposed thereon over the transmission line;

receiving the transmitted, second train of signals with the intersymbol interference imposed thereon;

detecting the intersymbol interference of the reference level signal in the second train of signals; and correcting the intersymbol interference imposed upon the multilevel signals of the second train corresponding to the detected intersymbol interference.

12. The method as claimed in claim 11, wherein there is further included the steps of:

storing the received, second train of multilevel signals including the reference level signals and a predetermined number of the multilevel signals preceding and following the transmitted reference level signal; and the correcting step, including adjusting the levels of the subsequently received signals in accordance with the intersymbol interference imposed upon the transmitted reference level signal in a direction to decrease the imposed intersymbol interference.

13. Apparatus for receiving and transmitting a multilevel signal having a given number of levels over a transmission line having input and output terminals, said apparatus comprising:

a. transmission means coupled to the input terminal of the transmission line, said transmission means including:
   1. reference means for providing a reference signal having a fewer number of defined levels than the given number; and
   2. inserting means for inserting the reference level signals in a first train of the multilevel signals at a predetermined time interval and for transmitting the thus formed second train of multilevel signals and inserted reference level signal along the transmission line; and
b. receiving means coupled to the output terminal of the transmission line, said receiving means including:
   1. detection means for receiving the second train including the multilevel signals and the reference level signals, and for detecting the intersymbol interference imposed by the transmission line on the reference level signal due to the presence of the adjacent multilevel signals, and
   2. adjustment means responsive to the detected intersymbol interference for correcting the intersymbol interference imposed upon the second train of the multilevel signals.

14. Apparatus for transmitting and receiving multilevel signals having a given number of levels over a transmission line having input and output terminals, the levels of the multilevel signals corresponding to a binary number of *n* bits, where *n* is a predetermined integer, said apparatus comprising:

a. transmission means coupled to the input terminal of the transmission line, said transmission means including reference means for providing a reference level signal having a fewer number of defined levels than the given number, at least one level being set at a magnitude corresponding to a transition point of a binary digit of a selected position of the *n* bits, and inserting means for inserting the reference level signal in a train of multilevel signals at predetermined time intervals and for transmitting the train of the multilevel signals and the inserted reference level signal over the transmission line; and
b. receiving means coupled to the output of the transmission line, said receiving means including detection means for receiving the transmitted multilevel signals and reference level signal and for detecting the intersymbol interference imposed by the transmission line on the reference level signal due to the adjacent multilevel signals, and adjustment means responsive to the detected intersymbol interference for correcting intersymbol interference imposed upon the multilevel signals.

15. Apparatus as claimed in claim 14, wherein said detection means includes means for decoding the multilevel signals into binary signals of *n* bits.

16. Apparatus as claimed in claim 14, wherein said detection means compares the received multilevel and reference signals with respect to a reference signal having a level of a magnitude corresponding to the transition point of the binary digit of the selected position for decoding the multilevel signals into corresponding binary signals of *n* bits and for providing first and second manifestations indicating respectively that each of the received reference level signals is above or below the reference signal level, said adjusting means responsive to the first and second manifestations for adjusting the levels of the received multilevel signals.

17. Apparatus as claimed in claim 16, wherein said adjusting means includes a delay line having a plurality of taps, a plurality of attenuating means, each associated with one of said taps, and integrating means for integrating the first and second manifestations to adjust the setting of each of said attenuating means.

18. Apparatus as claimed in claim 17, wherein said detection means provides the first and second manifestations, said adjusting means including logic means for providing the exclusive OR of the first and second manifestations, for adjusting said plurality of attenuating means.

* * * * *